(12) United States Patent
Alsina et al.

(10) Patent No.: US 9,542,172 B2
(45) Date of Patent: Jan. 10, 2017

(54) AUTOMATIC UPDATING OF APPLICATIONS

(71) Applicant: Apple Inc., Cupertino, CA (US)

(72) Inventors: Thomas Matthieu Alsina, Mountain View, CA (US); Sean Kelly, Cupertino, CA (US); Patrick Coffman, San Francisco, CA (US); Sam Gharabally, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 420 days.

(21) Appl. No.: 13/759,832

(22) Filed: Feb. 5, 2013

(65) Prior Publication Data

US 2014/0223423 A1    Aug. 7, 2014

(51) Int. Cl.
*G06F 9/44*    (2006.01)
*G06F 9/445*    (2006.01)

(52) U.S. Cl.
CPC ..................... *G06F 8/65* (2013.01)

(58) Field of Classification Search
None
See application file for complete search history.

(56) References Cited

U.S. PATENT DOCUMENTS

| | | |
|---|---|---|
| 4,747,040 A | 5/1988 | Blanset et al. |
| 4,787,026 A | 11/1988 | Barnes et al. |
| 4,984,149 A | 1/1991 | Iwashita et al. |
| 5,040,110 A | 8/1991 | Miki et al. |
| 5,131,069 A | 7/1992 | Hall et al. |
| 5,131,089 A | 7/1992 | Cole |
| 5,146,568 A | 9/1992 | Flaherty et al. |
| 5,257,378 A | 10/1993 | Sideserf et al. |
| 5,280,627 A | 1/1994 | Flaherty et al. |
| 5,291,564 A | 3/1994 | Shah et al. |

(Continued)

FOREIGN PATENT DOCUMENTS

| | | |
|---|---|---|
| TW | 200849861 | 12/2008 |
| TW | 201017202 | 5/2010 |

OTHER PUBLICATIONS

Mahajan et al., "Augmenting Mobile 3G Using WiFi", Proceedings of the 8th International conference on Mobile systems, applications, and services, 2010, pp. 209-222.*

(Continued)

*Primary Examiner* — Wei Zhen
*Assistant Examiner* — Timothy Duncan
(74) *Attorney, Agent, or Firm* — Fish & Richardson P.C.

(57) ABSTRACT

In some implementations, a mobile device can be configured to automatically download and install updates to applications installed on the mobile device. In some implementations, the automatic updates can be performed based on how the mobile device is connected to a network that provides access to the application updates. In some implementations, the automatic updates can be performed based on whether the mobile device has previously downloaded applications or application updates from a caching server. In some implementations, indicia can be presented on a graphical user interface of the mobile device to indicate which applications have been updated. In some implementations, an application update can be downloaded while the corresponding application is in use by the user. The application can be installed when the application is no longer being used by the user.

30 Claims, 9 Drawing Sheets

(56) References Cited

U.S. PATENT DOCUMENTS

| | | |
|---|---|---|
| 5,291,584 A | 3/1994 | Challa et al. |
| 5,325,529 A | 6/1994 | Brown et al. |
| 5,339,430 A | 8/1994 | Lundin et al. |
| 5,452,454 A | 9/1995 | Basu |
| 5,454,098 A | 9/1995 | Pisello et al. |
| 5,459,650 A | 10/1995 | Noro |
| 5,459,850 A | 10/1995 | Clay et al. |
| 5,465,364 A | 11/1995 | Lathrop et al. |
| 5,483,647 A | 1/1996 | Yu et al. |
| 5,491,513 A | 2/1996 | Wickstrom et al. |
| 5,491,813 A | 2/1996 | Bondy et al. |
| 5,499,378 A | 3/1996 | McNeill et al. |
| 5,546,585 A | 8/1996 | Soga |
| 5,548,783 A | 8/1996 | Jones et al. |
| 5,603,011 A | 2/1997 | Piazza |
| 5,666,293 A | 9/1997 | Metz et al. |
| 5,694,583 A | 12/1997 | Williams et al. |
| 5,717,903 A | 2/1998 | Bonola |
| 5,724,530 A | 3/1998 | Stein et al. |
| 5,742,829 A | 4/1998 | Davis et al. |
| 5,754,774 A | 5/1998 | Bittinger et al. |
| 5,758,165 A | 5/1998 | Shuff |
| 5,764,992 A | 6/1998 | Kullick et al. |
| 5,784,581 A | 7/1998 | Hannah |
| 5,802,297 A | 9/1998 | Engquist |
| 5,842,011 A | 11/1998 | Basu |
| 5,859,978 A | 1/1999 | Sonderegger et al. |
| 5,890,014 A | 3/1999 | Long |
| 5,892,909 A | 4/1999 | Grasso et al. |
| 5,916,047 A | 6/1999 | Schickert et al. |
| 5,918,048 A | 6/1999 | Mealey et al. |
| 5,926,631 A | 7/1999 | McGarvey |
| 5,946,469 A | 8/1999 | Chidester |
| 5,948,101 A | 9/1999 | David et al. |
| 5,953,516 A | 9/1999 | Bonola |
| 5,958,020 A | 9/1999 | Evoy et al. |
| 5,968,170 A | 10/1999 | Gross et al. |
| 5,974,547 A | 10/1999 | Klimenko |
| 6,006,029 A | 12/1999 | Bianchi et al. |
| 6,006,034 A | 12/1999 | Heath et al. |
| 6,009,274 A | 12/1999 | Fletcher et al. |
| 6,009,480 A | 12/1999 | Pleso |
| 6,012,103 A | 1/2000 | Sartore et al. |
| 6,016,400 A | 1/2000 | Day et al. |
| 6,016,402 A | 1/2000 | Thomas et al. |
| 6,020,914 A | 2/2000 | Douhet |
| 6,023,585 A | 2/2000 | Perlman et al. |
| 6,038,601 A | 3/2000 | Lambert et al. |
| 6,064,566 A | 5/2000 | Agata et al. |
| 6,066,182 A | 5/2000 | Wilde et al. |
| 6,067,618 A | 5/2000 | Weber |
| 6,073,205 A | 6/2000 | Thomson |
| 6,128,734 A | 10/2000 | Gross et al. |
| 6,130,668 A | 10/2000 | Stein |
| 6,134,614 A | 10/2000 | Chari et al. |
| 6,161,176 A | 12/2000 | Hunter et al. |
| 6,163,853 A | 12/2000 | Findlay et al. |
| 6,170,008 B1 | 1/2001 | Bahlmann et al. |
| 6,175,917 B1 | 1/2001 | Arrow et al. |
| 6,175,918 B1 | 1/2001 | Shimizu |
| 6,178,503 B1 | 1/2001 | Madden et al. |
| 6,185,678 B1 | 2/2001 | Arbaugh et al. |
| 6,198,558 B1 | 3/2001 | Graves et al. |
| 6,199,204 B1 | 3/2001 | Donohue |
| 6,202,091 B1 | 3/2001 | Godse |
| 6,204,847 B1 | 3/2001 | Wright |
| 6,205,473 B1 | 3/2001 | Thomasson et al. |
| 6,209,031 B1 | 3/2001 | Casey et al. |
| 6,209,089 B1 | 3/2001 | Selitrennikoff et al. |
| 6,252,889 B1 | 6/2001 | Patki et al. |
| 6,253,209 B1 | 6/2001 | Chase-Salerno et al. |
| 6,260,068 B1 | 7/2001 | Zalewski et al. |
| 6,266,809 B1 | 7/2001 | Craig et al. |
| 6,269,396 B1 | 7/2001 | Shah et al. |
| 6,269,481 B1 | 7/2001 | Perlman et al. |
| 6,275,851 B1 | 8/2001 | Cromer et al. |
| 6,279,030 B1 | 8/2001 | Britton et al. |
| 6,279,109 B1 | 8/2001 | Brundridge |
| 6,292,941 B1 | 9/2001 | Jollands |
| 6,314,438 B1 | 11/2001 | Stein et al. |
| 6,317,826 B1 | 11/2001 | McCall et al. |
| 6,324,691 B1 | 11/2001 | Gazdik |
| 6,330,653 B1 | 12/2001 | Murray et al. |
| 6,330,715 B1 | 12/2001 | Razzaghe-Ashrafi |
| 6,334,149 B1 | 12/2001 | Davis, Jr. et al. |
| 6,345,294 B1 | 2/2002 | O'Toole et al. |
| 6,345,309 B2 | 2/2002 | Ohsawa et al. |
| 6,357,040 B1 | 3/2002 | Porter |
| 6,374,363 B1 | 4/2002 | Wu et al. |
| 6,393,560 B1 | 5/2002 | Merrill et al. |
| 6,401,093 B1 | 6/2002 | Anand et al. |
| 6,421,777 B1 | 7/2002 | Pierre-Louis et al. |
| 6,434,695 B1 | 8/2002 | Esfahani et al. |
| 6,438,683 B1 | 8/2002 | Endsley |
| 6,466,203 B2 | 10/2002 | Van Ee |
| 6,466,972 B1 | 10/2002 | Paul et al. |
| 6,477,642 B1 | 11/2002 | Lupo |
| 6,487,601 B1 | 11/2002 | Hubacher et al. |
| 6,490,677 B1 | 12/2002 | Aguilar et al. |
| 6,505,243 B1 | 1/2003 | Lortz |
| 6,513,061 B1 | 1/2003 | Ebata et al. |
| 6,519,633 B1 | 2/2003 | Kubik et al. |
| 6,529,948 B1 | 3/2003 | Bowman-Amuah |
| 6,535,976 B1 | 3/2003 | Hoggarth et al. |
| 6,543,004 B1 | 4/2003 | Cagle et al. |
| 6,564,232 B1 | 5/2003 | Cole et al. |
| 6,578,069 B1 | 6/2003 | Hopmann et al. |
| 6,606,744 B1 | 8/2003 | Mikurak |
| 6,611,915 B1 | 8/2003 | Kubik et al. |
| 6,625,754 B1 | 9/2003 | Aguilar et al. |
| 6,631,442 B1 | 10/2003 | Blumenau |
| 6,633,916 B2 | 10/2003 | Kauffman |
| 6,671,748 B1 | 12/2003 | Cole et al. |
| 6,718,549 B1 | 4/2004 | Narin et al. |
| 6,728,787 B1 | 4/2004 | Leigh |
| 6,735,741 B1 | 5/2004 | Pannu |
| 6,751,658 B1 | 6/2004 | Haun et al. |
| 6,751,794 B1 | 6/2004 | McCaleb et al. |
| 6,757,706 B1 | 6/2004 | Dong et al. |
| 6,785,885 B2 | 8/2004 | Norris et al. |
| 6,807,558 B1 | 10/2004 | Hassett et al. |
| 6,807,641 B1 | 10/2004 | Ishiguro et al. |
| 6,854,112 B2 | 2/2005 | Crespo et al. |
| 6,944,185 B2 | 9/2005 | Patki et al. |
| 6,944,857 B1 | 9/2005 | Glaser et al. |
| 6,976,057 B2 | 12/2005 | Yoshiasa |
| 6,976,252 B2 | 12/2005 | White et al. |
| 6,996,076 B1 | 2/2006 | Forbes et al. |
| 7,076,774 B2 | 7/2006 | Chrysanthakopoulos et al. |
| 7,089,551 B2 | 8/2006 | Fordemwalt et al. |
| 7,089,553 B1 | 8/2006 | Glaser et al. |
| 7,162,539 B2 | 1/2007 | Garcie-Luna-Aceves |
| 7,180,858 B1 | 2/2007 | Roy et al. |
| 7,249,354 B2 | 7/2007 | Tigani et al. |
| 7,281,047 B2 | 10/2007 | Hayko et al. |
| 7,343,422 B2 | 3/2008 | Garcia-Luna-Aceves et al. |
| 7,552,233 B2 | 6/2009 | Raju et al. |
| 7,565,450 B2 | 7/2009 | Garcia-Luna-Aceves et al. |
| 7,577,754 B2 | 8/2009 | Garcia-Luna-Aceves et al. |
| 7,664,876 B2 | 2/2010 | Garcia-Luna-Aceves et al. |
| 7,725,596 B2 | 5/2010 | Garcia-Luna-Aceves et al. |
| 7,730,155 B1 | 6/2010 | Meyer et al. |
| 7,730,159 B1 | 6/2010 | Meyer et al. |
| 7,765,277 B1 | 7/2010 | Meyer et al. |
| 7,797,353 B1 | 9/2010 | Singh |
| 7,908,337 B2 | 3/2011 | Garcia-Luna-Aceves et al. |
| 8,594,850 B1* | 11/2013 | Gourlay et al. .............. 700/276 |
| 8,838,731 B2 | 9/2014 | Meyer et al. |
| 2003/0088716 A1 | 5/2003 | Sanders |
| 2004/0015953 A1 | 1/2004 | Vincent |
| 2004/0024848 A1 | 2/2004 | Smith et al. |
| 2005/0055687 A1 | 3/2005 | Mayer |
| 2006/0082467 A1* | 4/2006 | Funk .................. H04N 7/17318 |
| | | 340/815.45 |

(56) References Cited

U.S. PATENT DOCUMENTS

| | | | |
|---|---|---|---|
| 2006/0130037 A1* | 6/2006 | Mackay | 717/168 |
| 2006/0206450 A1 | 9/2006 | Fletcher et al. | |
| 2007/0006216 A1* | 1/2007 | Nakane | G06F 8/65 717/173 |
| 2007/0211674 A1* | 9/2007 | Ragnar Karlberg | H04W 48/18 370/338 |
| 2008/0102815 A1* | 5/2008 | Sengupta | H04W 36/24 455/424 |
| 2008/0209410 A1 | 8/2008 | Demsky et al. | |
| 2009/0064122 A1 | 3/2009 | Bielski | |
| 2009/0217244 A1 | 8/2009 | Bozak et al. | |
| 2009/0307682 A1 | 12/2009 | Gharabally et al. | |
| 2011/0286437 A1* | 11/2011 | Austin | H04W 4/02 370/338 |
| 2012/0106458 A1* | 5/2012 | Jang | H04L 67/327 370/328 |
| 2013/0185563 A1* | 7/2013 | Djabarov et al. | 713/176 |
| 2013/0339942 A1* | 12/2013 | Brunsman | G06F 8/61 717/173 |
| 2014/0040412 A1* | 2/2014 | Yanagihara | H04L 67/2842 709/213 |
| 2014/0068587 A1* | 3/2014 | Krishna | G06F 8/65 717/169 |
| 2014/0082513 A1* | 3/2014 | Mills | H04L 41/069 715/744 |
| 2014/0130064 A1* | 5/2014 | Haemel et al. | 719/327 |
| 2014/0179272 A1* | 6/2014 | Zhang | H04W 4/001 455/411 |
| 2014/0365561 A1 | 12/2014 | Meyer et al. | |

OTHER PUBLICATIONS

MacRumors Forum, "Wifi Sync: Does it Sync App Updates?", http://forums.macrumors.com/showthread.php?t=1265936, accessed on Apr. 3, 2015.*

Roy, "How to Make Android Apps Update Via Wi-Fi Only", http://techlogon.com/2011/12/20/how-to-make-android-apps-update-via-wi-fi-only/, access on Apr. 3, 2015.*

Kellex, "Android Market Now Allows for Content Filtering", May 14, 2011, DroidLife, http://www.droid-life.com/2011/05/14/android-market-now-allows-for-content-filtering/, accessed on Aug. 22, 2015.*

Lindgren, "Efficient Content Distribution in an Information-centric Hybrid Mobile Network", 2011 IEEE Consumer Communications and Networking Conference (CCNC), Jan. 9-12, 2011, pp. 1134-1138.*

International Search Report and Written Opinion in International Application No. PCT/US2014/014662, dated mailed May 23, 2014, 13 pages.

Ruddock, "Android Market 3.3.11 Adds New Settings," Apr. 25, 2012, Retrieved from the Internet: URL: http ://www.androidpol ice. coni/2011/11/01/download-android-market-3-3-ll-adds-new-settings-default-auto-update-update-over-wi-fi-only-shortcuts-and-more/ [retrieved on May 7, 2014], 5 pages.

Vartiainen et al., "Auto-update," Proc 4th Intl Conference Mobile Technol, Apps, Systems, and 1st Intl Symposium on Computer Human Interaction in Mobile Technol, Mobility '07, Jan. 2007, 683-689.

Arbaugh, William A., et al. "A Secure and Reliable Bootstrap Architecture" IEEE Symposium on Security and Privacy, May 4-5, 1997, pp. 65-71.

Burke, Michael G. et al., "The Jalapeno Dynamic Optimizing Compiler for Java TM.," IBM Thomas J. Watson Research Center, 1999 (13 pages).

Campbell, Andrew T. et al., "A Survey of Programmable Networks," 1999, 18 pages.

Chuang, Shaw-Cheng et al., "A Case Study of Secure ATM Switch Booting," IEEE 1996 (10 pages).

Croft, Bill and Gilmore, John. "Bootstrap Protocol (BOOTP)" Network Working Group RFC 951, Sep. 1985 (12 pages).

Davidson, Rusel and MacKinnon James G., "Bootstrap Tests: How Many Bootstraps?" Jun. 1998 (15 pages).

Estrin, Deborah et al. "A Dynamic Bootstrap Mechanism for Rendezvous-Based Multicast Routing" IEEE INFOCOM '99. Eighteenth Annual Joint Conference of the IEEE Computer and Communications Societies. vol. 3, Mar. 21-25, 1999, pp. 1090-1098.

Ford, Bryan et al. "The Flux OS Toolkit: Reusable Components for OS Implementation" IEEE May 5-6, 1997, pp. 14-19.

Ford et al., "The Flux OSKit: A Substrate for Kernel and Language Research," The University of Utah: School of Computing, © 1997, retrieved on Jul. 21, 2016, https://www.cs.utah.edu/flux/papers/oskit-sosp97.html, 33 pages.

Hesterberg, Tim C., "Bootstrap Tilting Inteference and Large Data Sets—Proposal to NSF SBIR Program," Jun. 11, 1998, pp. 2-22.

Reynolds, J. "BOOTP Vendor Information Extensions" Network Working Group RFC 1395, Jan. 1993 (8 pages).

Uhlig, Richard et al., "Trap-Driven Simulation with Tapeworm II," 6th Int. Conf. Architectural Support for Programmin Languages and Operating Systems (ASPLOS-VI), Oct. 1994, 14 pages.

Wimer, W. "Clarifications and Extensions for the Bootstrap Protocol" Network Working Group, RFC 1532, Oct. 1993 (22 pages).

"Device Configuration Assistant Design Overview" Sun Microsystems, 1999, 8 pages.

"Etherboot," downloaded from www.slug.org.au/etherboot/ on Oct. 11, 1999, 4 pages.

"Netboot Introduction", Downloaded from www.han.de/.about. gero/netboot/english/introduction.html on Oct. 11, 1999, 13 pages.

Alexander, S. "HDCP Options and BOOTP Vendor Extensions" Network Working Group, RFC 2132, Mar. 1997 (35 pages).

Apple Computer, Inc., "Getting Started with Mac OS X Server: Includes Installation and Setup Inforamtion for Mac OS X Server version 10.2," pp. 1-24, 2002.

Hobbs, M.J. et al., "Booting of the RHODOS Distributed Operating System," Sep. 8, 1984, 18 pages.

Kaszeta, Rich"A New Use for Old and Outdated PC's," Downloaded from www.menet.umn.edu/'kaszeta/unix/xterminal/index. html on Oct. 11, 1999, 8 pages.

Red Hat, Inc., "Red Hat Linux 9: Red Hat Linux Customization Guide," chapter 7-8, 43 pages, 2003.

Wong, P.K. "Remote Boot Windows 95a Step by Step Instructions," Downloaded from wpkgate.kc.com.my/remoteboot/win95.txt on Oct. 11, 1999, 5 pages.

* cited by examiner

AUTOMATIC UPDATING OF APPLICATIONS

TECHNICAL FIELD

The disclosure generally relates to mechanisms for updating applications on computing devices.

BACKGROUND

Users of mobile computing devices can install applications on mobile devices to enable the mobile devices to perform a variety of tasks. Developers of the applications will often update the applications with various improvements or bug fixes. When applications are updated, users can be notified and prompted to download the application updates. If the user has installed a large number of applications on the mobile device, the user can be frequently prompted to download new updates for the applications on the mobile device and can be required to provide input to initiate the downloading and installing of the new application updates. Having to deal with the frequent application update notifications and user input requirements for downloading application updates can be annoying and tedious for the user.

SUMMARY

In some implementations, a mobile device can be configured to automatically download and install updates to applications installed on the mobile device. In some implementations, the automatic updates can be performed based on how the mobile device is connected to a network that provides access to the application updates. In some implementations, the automatic updates can be performed based on whether the mobile device has previously downloaded applications or application updates from a caching server. In some implementations, indicia can be presented on a graphical user interface of the mobile device to indicate which applications have been updated. In some implementations, an application update can be downloaded while the corresponding application is in use by the user. The application can be installed when the application is no longer being used by the user.

In some implementations, an application service can store application data that indicates whether an application should be automatically updated on a mobile device. In some implementations, the application service can collect application version information from mobile devices and use the application version information to determine which application versions should be available for download from the application service. The application service can determine based on the application version information whether the mobile device should perform a full or partial application update.

Particular implementations provide at least the following advantages: Users are not required to provide input to download application updates. Automatic application updates are performed based on connectivity to WiFi, cellular data, and/or a caching server, thereby reducing cellular data usage when updating applications and improving download speed. Users will not be prevented from using an application installed on the mobile device while application updates are being downloaded.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

System Overview

Figure 1:
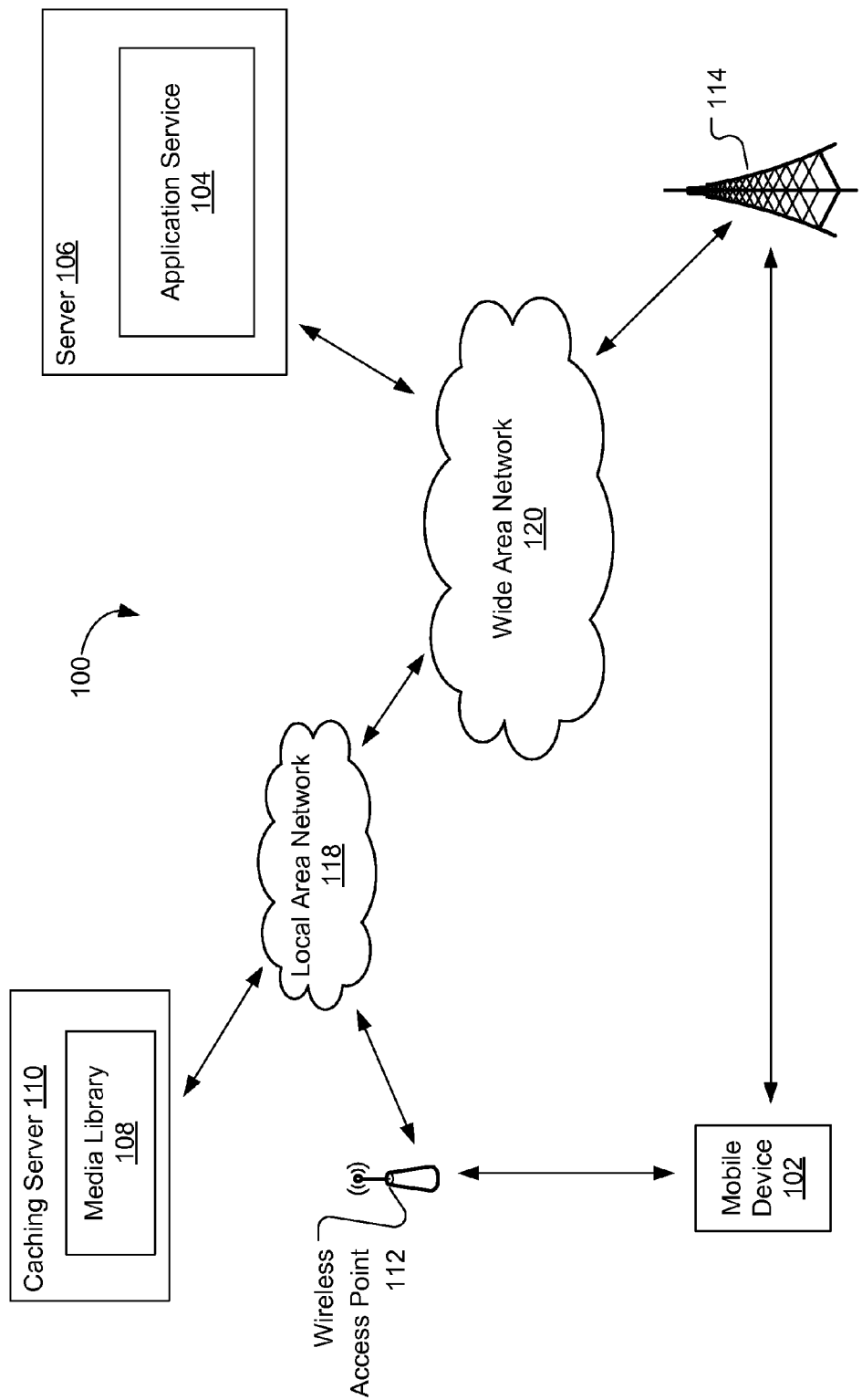
FIG. 1 illustrates an example system for performing automatic updating of applications on a mobile device.

FIG. 1 illustrates an example system 100 for performing automatic updating of applications on a mobile device. While the description below discloses processes, functions and features of a mobile device with respect to automatic updating of applications, the disclosed processes, functions and features can be used to perform automatic updating of electronic books or other media that can be updated. For example, system 100 can include a mobile device 102 that is configured with applications that perform a variety of functions. The applications can be downloaded to mobile device 102 from application service 104 executing on server 106, for example. The applications can be downloaded in response to a user selecting the applications from a collection of applications available through application service 104. For example, application service 104 can be an internet based application store from which a user can purchase, download and install applications on the mobile device.

In some implementations, mobile device 102 can download applications from media library 108 hosted by caching server 110. For example, media library 108 can include applications previously purchased and/or downloaded to caching server 110 by the user. Media library 108 can be a software application that maintains a repository of media (e.g., applications, electronic books, music, videos, etc.), for example. Caching server 110 can be a computing device of the user. For example, caching server 110 can be a computing device accessible through the user's home network (e.g., local area network 118). Caching server 110 can be a computing device accessible through a corporate network (e.g., local area network 118). The user can select applications from media library 108 to download to and install on the mobile device. Once mobile device 102 has downloaded the selected applications, mobile device 102 can install the applications on the mobile device.

In some implementations, mobile device 102 can periodically query application service 104 (or media library 108) to determine if there are updates available for the applications installed on mobile device 102. For example, mobile device 102 can send application information, including application identifiers, version numbers, etc., for each application installed on mobile device 102 to application service 104. Application service 104 can compare the version number of an application installed on mobile device 102 to the current version (e.g., latest version) of the application available to application service 104. If a newer version (e.g., update) of the application is available, application service 104 can transmit back to mobile device 102 a list of applications that have updates available to download. For example, application service 104 can transmit application names, identifiers, version numbers, etc., of updated applications to mobile device 102.

In some implementations, application service 104 will track installed application version information received from mobile devices and determine which versions of applications to retain at the application service based on the installed application versions. For example, application service 104 can maintain a repository of applications and application versions. Application service 104 can remove older versions of applications when the application version information received from the mobile devices indicates that the older application versions are no longer needed. For example, if an application in the repository has versions one through six (1-6) but the application version information received from the mobile devices indicates that the oldest version installed on any mobile device is version four (4), then application service 104 can delete or remove versions 1-3 of the application from the application version repository. Thus, application service 104 can more efficiently maintain the application service repository and make available storage capacity that can be used to store other applications or data.

In some implementations, mobile device 102 can be configured to automatically download application updates. For example, mobile device can automatically download and install the application updates identified by application service 104. In some implementations, mobile device 102 can be configured to prefer downloading application updates from caching server 110. For example, mobile device 102 can connect to caching server 110 through local area network (LAN) 118. Mobile device 102 can connect to LAN 118 through wireless access point 112, for example.

In some implementations, mobile device 102 can store information that identifies devices from which mobile device 102 has previously downloaded applications or other media (e.g., electronic books). For example, if mobile device 102 has previously downloaded an application or other media from caching server 110, mobile device 102 can store information that identifies caching server 110 as a source for media downloads. If mobile device 102 has previously downloaded an application or other media from server 106, then mobile device 102 can store information that identifies server 106 as a source for media downloads. In some implementations, the information that identifies caching server 110 (e.g., the internet protocol address) can be used to determine if caching server 110 is hosted on a LAN that mobile device 102 regularly connects to. If the caching server 110 is accessible through a LAN (e.g., LAN 118), then when mobile device 102 receives information identifying updated applications, mobile device 102 will attempt to download the application updates from caching server 110 before attempting to download the application updates from server 106, as described in further detail below.

By configuring mobile device 102 to prefer downloading application updates from caching server 110 through LAN 118, the amount of time and bandwidth required to download application updates can be reduced. For example, the connection between two devices on the same LAN is often faster than a connection over a WAN because of the reduced distance and the reduced number of network devices (e.g., routers) that need to be traversed. Moreover, the caching server can download an application update once and serve the application update to multiple devices over the LAN thereby reducing the bandwidth required between the LAN and server 106 to serve application updates to the multiple devices.

In some implementations, mobile device 102 can be configured to prefer downloading application updates through wireless access point 112 or LAN 118. For example, mobile device 102 can determine whether mobile device 102 is connected to wide area network (WAN) 120 (e.g., the internet) through a WiFi connection (e.g., wireless access point 112 and LAN 118) or through a cellular data connection (e.g., radio access technology transceiver 114, CDMA, LTE, WiMAX, GSM, etc.). If mobile device 102 is connected to WAN 120 through cellular data, mobile device 102 can be configured to wait until mobile device 120 is connected to wireless access point 112 (e.g., WiFi) to download application updates. By configuring mobile device 102 to prefer a WiFi connection for downloading application updates, the user can experience faster application downloads and the user will not be charged by the cellular data provider for using cellular data when downloading application updates.

Automatically Updating Applications at Mobile Device

Figure 2:
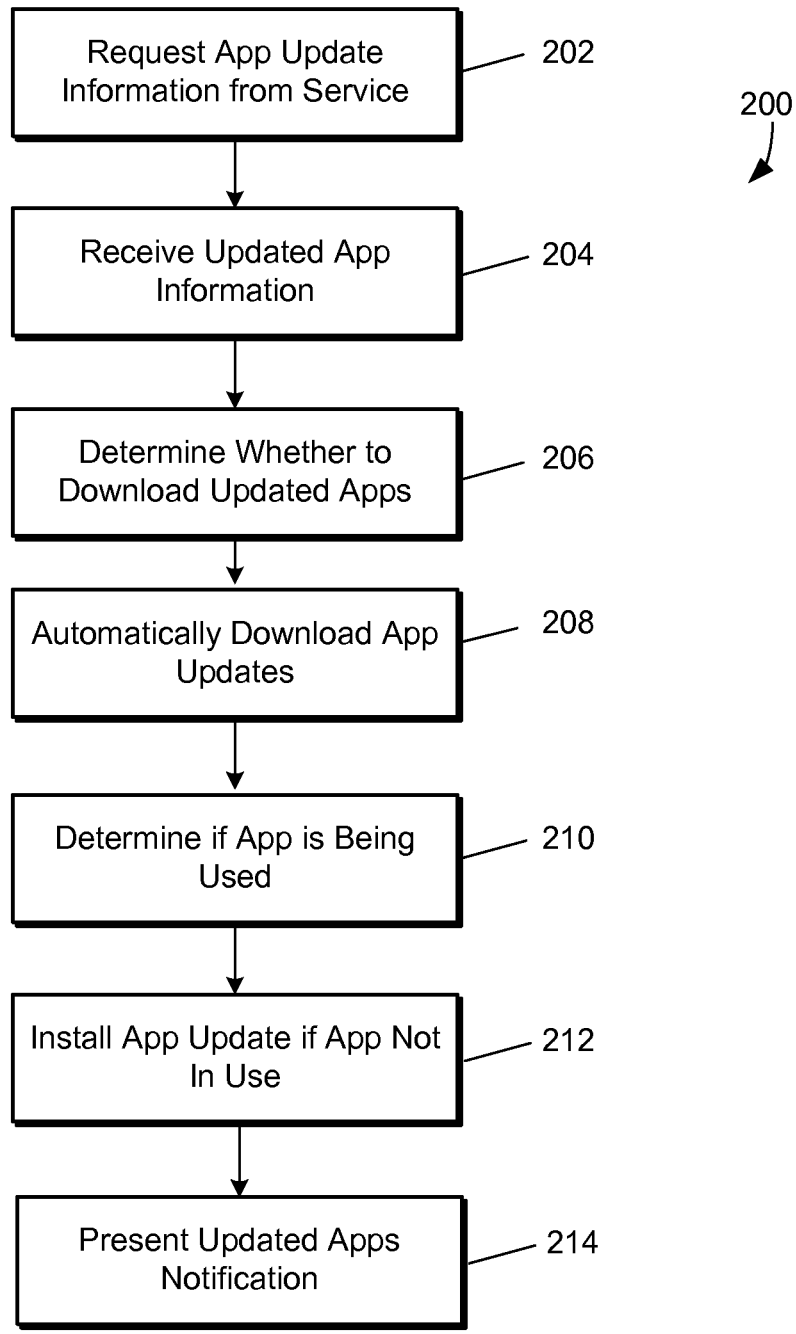
FIG. 2 is a flow diagram an example client process for performing automatic updating of applications.

FIG. 2 is a flow diagram an example client process 200 for performing automatic updating of applications. At step 202, a mobile device (e.g., client device) can request application update information from an application service. For example, the mobile device (e.g., mobile device 102) can download applications from the application service (e.g., application service 104) and install the applications on mobile device 102. The mobile device can later request from the application service information identifying updates to the applications installed on the mobile device. For example, the request can include information identifying the applications installed on the mobile device. The installed application information can include application identifiers and version identifiers for each application installed on the mobile device. In some implementations, the mobile device can periodically poll the application service to request application update information.

At step 204, the mobile device can receive updated application information. For example, the application service can compare the installed application information received by the application service in the application update request to information about the current versions of the installed applications available through the application service. For example, the application service can compare the versions of the applications installed on the mobile device to the current versions of the applications available for downloading from the application service to determine if an update is available for the applications installed on the mobile device. The application service can then send to the mobile device information identifying which installed applications have been updated. For example, the information identifying updated applications can include, for each updated application an application identifier, a version identifier and/or a description of changes or updates made to the application. The updated application information can include a link (e.g., URL) to the application update that the mobile device can use to download the application update. For example, the link can point to a partial application update (e.g., one or more files that contain only the changes or updates to the application). The link can point to a full application update (e.g., a complete updated application).

At step 206, the mobile device can determine whether to download application updates. For example, the mobile device can be configured to prefer updating from a caching server when the mobile device has previously downloaded an application from the caching server. Thus, the mobile device can be configured to wait for a connection to the caching server to be established before downloading application updates. The mobile device can be configured to prefer downloading over WiFi instead of downloading over cellular data. Thus, the mobile device can be configured to wait for a WiFi connection to be established before downloading application updates. The mobile device can be configured to download application updates over a cellular data connection when a specified wait period (e.g., amount of time) has elapsed. The determination whether to download application updates is described in further detail with reference to the decision flow diagram of FIG. 3.

In some implementations, parental control settings can prevent application updates from being downloaded to the mobile device. For example, the updated application information can include parental control ratings (e.g., G, PG, PG-13, R, etc.) for each application update. If the parental control rating for an updated application exceeds the parental control rating limit configured for the mobile device (e.g., the parental control configuration restricts applications to a PG rating but the application update changes the rating of the application to an R rating), then the mobile device will not download and install the application update.

At step 208, once the mobile device has determined that an application update download should be performed, the mobile device can automatically download application updates to the mobile device. For example, the mobile device can automatically download application updates from media library 108 stored on caching server 110 or from an application service 104 executing on server 106. In some implementations, an update for an application can be downloaded to the mobile device even while the application is being used by a user. In some implementations, automatic application update downloads will be initiated upon connection to a WiFi access point. In some implementations, automatic application update downloads will be initiated upon connection to the caching server. In some implementations, automatic application updates will be performed over a cellular data connection when a connection to the caching server and/or WiFi access point has not been established within a specified period of time.

In some implementations, user initiated downloads will be prioritized over automatic application update downloads. For example, if the user selects an application or other media item to download to the mobile device, the automatic application update download can be paused (e.g., suspended) while the selected application or media item is downloaded to the device. Once the user selected item is downloaded, the automatic application update download can be resumed by the mobile device.

At step 210, the mobile device can determine whether an application to be updated on the mobile device is currently being used by a user of the mobile device. For example, the mobile device can be configured with a function that identifies what applications are currently executing on and/or are currently in the foreground of a display of the mobile device.

At step 212, the mobile device can install the application update if the application is not currently being used by a user of the mobile device. For example, if the application is not currently executing on and/or is not currently in the foreground of the display of the mobile device, the downloaded application update for the application can be installed.

At step 214, the mobile device can present a notification indicating which applications have been updated. For example, the mobile device can present indicia on a graphical user interface of the mobile device indicating which applications have been updated. In some implementations, the mobile device can present an interface identifying (e.g., listing) the updated applications.

In some implementations, an automatic application update failure will be silently handled. For example, when an automatic application update download or installation fails, no notification of the failure will be presented to the user. If a download or installation failure occurs, the download or installation can be attempted again in the future. If the application cannot be updated with a specified period of time, then the user can be notified that the application update is available but has not been downloaded. In some implementations, a failure will cause a notification to be displayed to the user. The notification can indicate the application and version number of the failed download and/or installation, for example.

Figure 3:
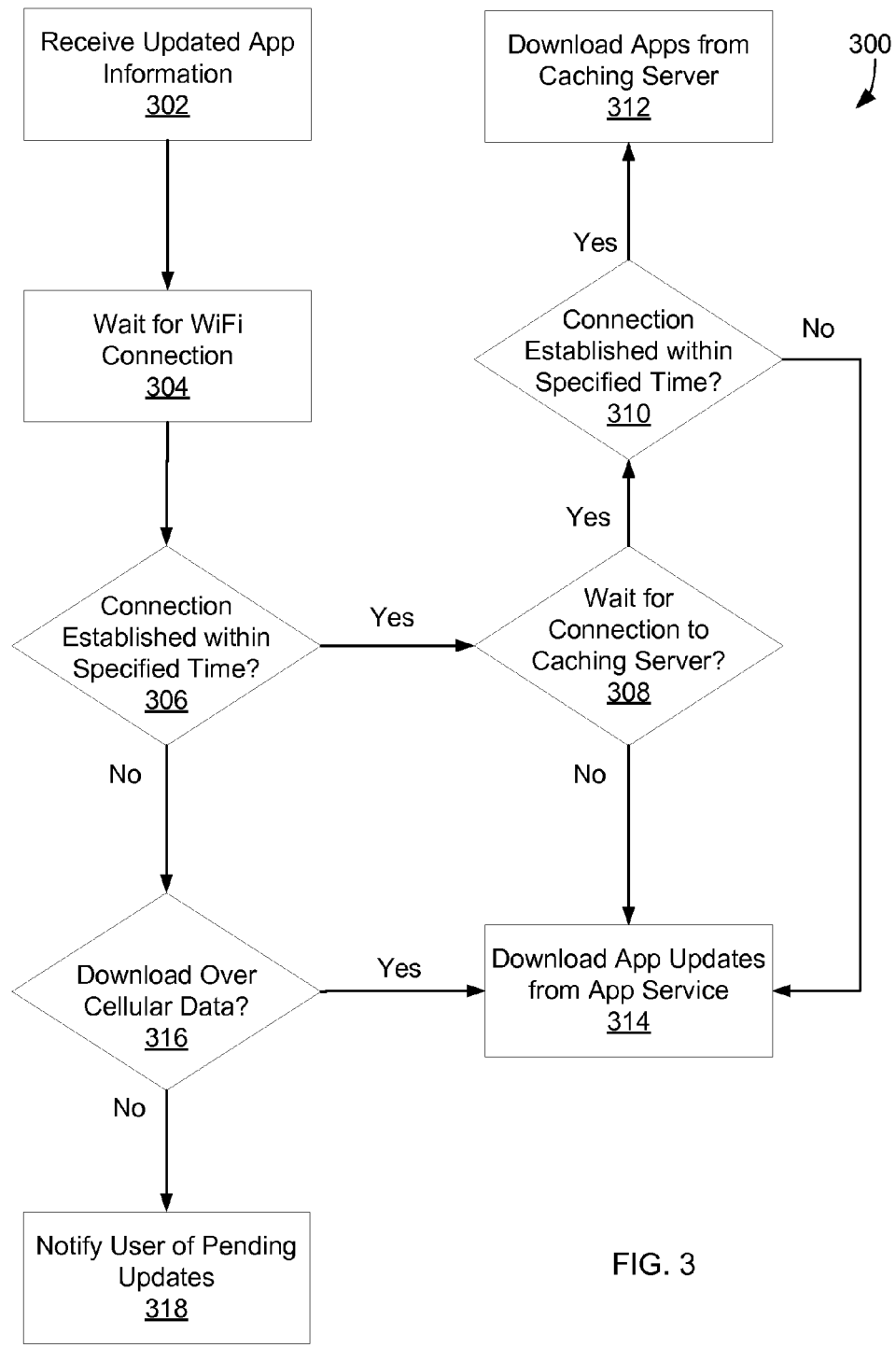
FIG. 3 is an example flow diagram for determining whether to automatically download application updates to a mobile device.

FIG. 3 is an example flow diagram 300 for determining whether to automatically download application updates to a mobile device. For example, flow diagram 300 can be performed at step 206 of process 200 above. At 302, a mobile device can receive updated application information from an application service. For example, the updated application information can identify which applications installed on the mobile device have updates available for download at the application service. The updated application information can include application identifiers, updated application version identifiers and/or links to updated application files to download and install on the mobile device.

At 304, the mobile device can wait for a WiFi connection. For example, the mobile device can be configured to wait for a connection to a WiFi network (e.g., WiFi access point) before downloading application updates. The mobile device can be configured to wait a specified amount of time for a WiFi connection. For example, the WiFi wait period can be five days.

At 306, the mobile device can determine whether the mobile device has established a WiFi connection within the specified amount of time. For example, the WiFi wait period can begin when the mobile device receives information identifying applications that have been updated at the application service. The WiFi wait period can be applied to each individual application update. Thus, the WiFi wait period can expire at different times for applications that were updated on different days.

At 308, if the mobile device establishes a WiFi connection within the specified amount of time, the mobile device can determine whether to wait for a connection to a caching server. For example, the mobile device can be configured to wait a specified amount of time (a caching server wait period) for a connection to a caching server and download application updates from the caching server. For example, if the mobile device has previously downloaded applications and/or application updates from a caching server, then the mobile device can wait a specified amount of time for the next connection to the caching server to download application updates from the caching server.

At 310, if the mobile device is configured to wait for a caching server, the mobile device can determine whether the mobile device has established a connection with the caching server within a specified amount of time (e.g., three days) since the application update information was received by the mobile device. If the mobile device establishes a connection with the caching server within the caching server wait period, then the mobile device can download application updates from the caching server at 312.

At 314, if a WiFi connection is established at 306 but the mobile device is not configured to wait for a connection to the caching server at 308 or has not established a connection to the caching server within the caching server wait period at 310, then the mobile device can download the application updates from the application service at 314.

At 316, if a WiFi connection is not established within the specified amount of time (e.g., WiFi wait period), then the mobile device can determine whether to automatically download application updates over a cellular data connection. For example, the user can enable or disable automatic application update downloads over cellular data. If cellular data downloads are enabled, the mobile device can download application updates from the application service at 314 over a cellular data connection. If cellular data downloads are disabled or if the size of the application update data is greater than a threshold size (e.g., 50 Mb), then the mobile device can notify the user of pending (e.g., not downloaded or installed) application updates 318 and wait for the user to initiate downloading application updates.

In some implementations, if downloads over cellular data is disabled, the amount of time (e.g., WiFi wait period) that the mobile device will wait for a WiFi connection can be extended. For example, the mobile device can be configured to wait for a WiFi connection for five days if cellular data downloads are enabled. If cellular data downloads are disabled, the mobile device can be configured to wait ten days for a WiFi connection before notifying the user that there are pending application updates.

Determining Application Updates at Server

Figure 4:
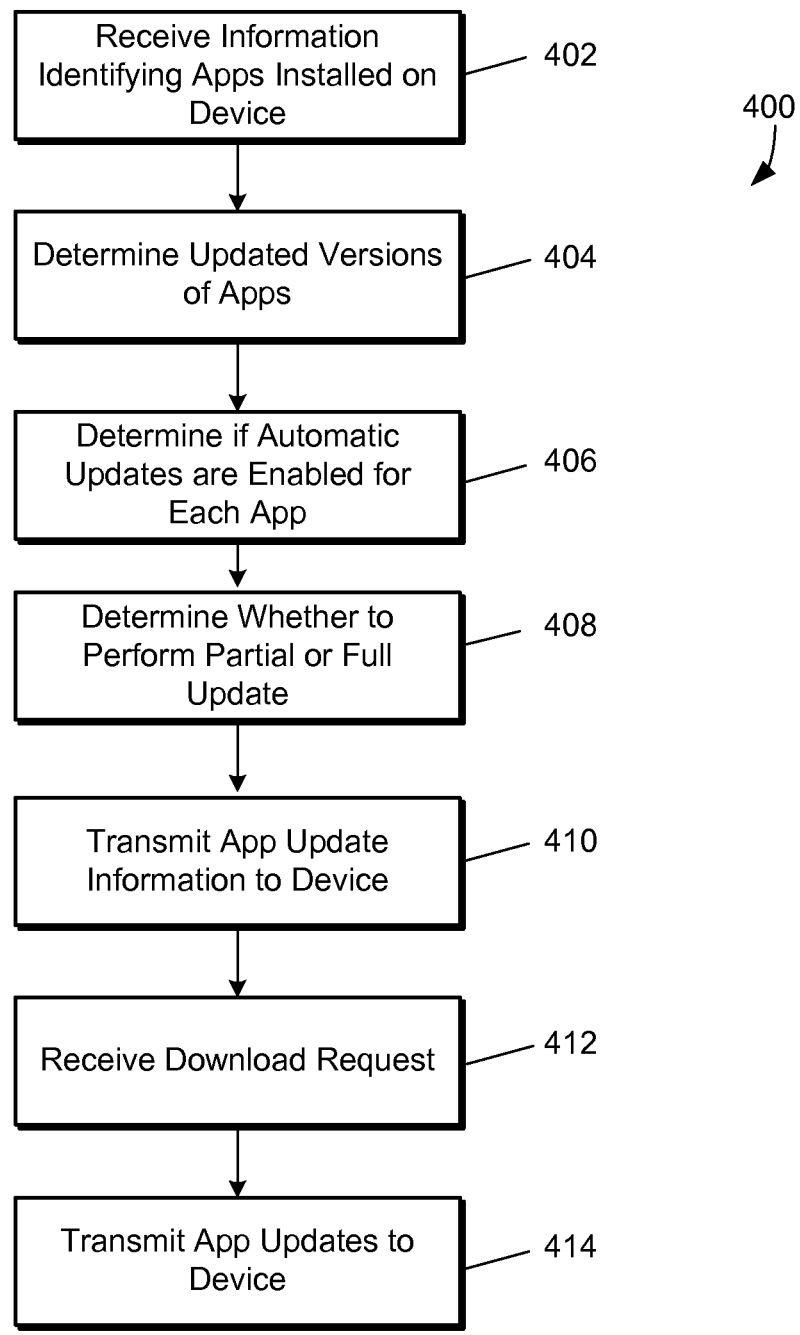
FIG. 4 is a flow diagram of an example server process for performing automatic updating of applications.

FIG. 4 is a flow diagram of an example server process 400 for performing automatic updating of applications. At step 402, a server (e.g., server 106, application service 104, or caching server 110) can receive information identifying applications installed on a mobile device. For example, the information can be received in a request for application update information from a mobile device. The installed application information can include a mobile device identifier and application identifiers and application version identifiers, for example.

In some implementations, the server can store installed application information received from many mobile devices so that the server can determine which application versions should be stored or retained at the server. For example, if the application version information received from the mobile devices indicates that version 4 is the oldest version of an application installed on the mobile devices, the server can delete from storage versions of the application that are older than version 4 (e.g., versions 1-3).

At step 404, the server can determine which installed applications have updated versions available at the server. For example, the server can compare the application identifiers and/or the version identifiers to corresponding applications and/or application updates on the server to determine whether an update exists for an application installed on the mobile device. For example, if the version of an application installed on the mobile device is different than the latest (e.g., most current) version of the application available at the server, then an application update exists for the installed application.

In some implementations, instead of waiting for a client request, the server can send notifications to mobile devices when applications have been updated. For example, when the server receives an application update from an application developer, the server can send an application update notification to all mobile devices that have corresponding application installed. The mobile device can then attempt to download and update the application according to the processes described herein.

At step 406, the server can determine if automatic updates are enabled for each application. For example, an application developer can upload an updated application (e.g., full application) to the server (e.g., to the application service). When the application or application update is uploaded to the server, the developer can specify that the application should not be automatically updated on mobile devices. For example, the server can maintain application metadata for each application that indicates whether the application can be automatically updated on mobile devices. If the metadata indicates that the application should not be automatically updated by mobile devices, then the server will exclude the application from the application update information that will be sent to the mobile device and the mobile device will not download the application. Alternatively, if the metadata indicates that the application should not be automatically updated, the server can send application update information for the application to the mobile device. The application update information can include information indicating that the mobile device should not automatically apply the application update, for example. The mobile device can then indicate to the user (e.g., an icon or graphic on the display of the mobile device) that an application update is available for the application. The user can then choose whether to download and install the application update.

At step 408, the server can determine for each updated application whether a full or partial application update. For example, a full update will cause the mobile device to download the entire application. A partial update will cause the mobile device to download only changes to the application. For example, if a partial update is performed, then only portions (e.g., files, libraries, etc.) of the application that have changed since the mobile device last downloaded the application will be downloaded to the mobile device. In some implementations, if the server determines that there is only one version difference between the application installed on the mobile device and the current or latest version of the application available on the server (e.g., the installed version is the immediate predecessor of the application version on the server), then the server will determine that a partial application update should be performed. In some implementations, if there is more than one version difference between the installed version of the application and the current or latest version of the application on the server, then a full application update will be performed (e.g., the entire application will be downloaded).

At step 410, the server can transmit application update information to the mobile device. For example, the server can send to the mobile device a list of installed applications that have updates that are available for download from the server. The application update information can include application identifiers, version identifiers and/or an identifier (e.g., file name) for or link (e.g., URL) to the full application or partial update files.

At step 412, the server can receive an application update download request from the mobile device. For example, the request can include application identifiers, application version identifiers and/or file identifiers. The server can use the information in the application request to identify which application updates (e.g., which application files, the entire application, a portion of the application, change data) to transmit to the mobile device. At step 414, the server can transmit the application updates to the mobile device.

Example User Interfaces

This disclosure describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radial buttons, checkboxes and any other mechanism for receiving input from, or providing feedback to a user.

Figure 5:
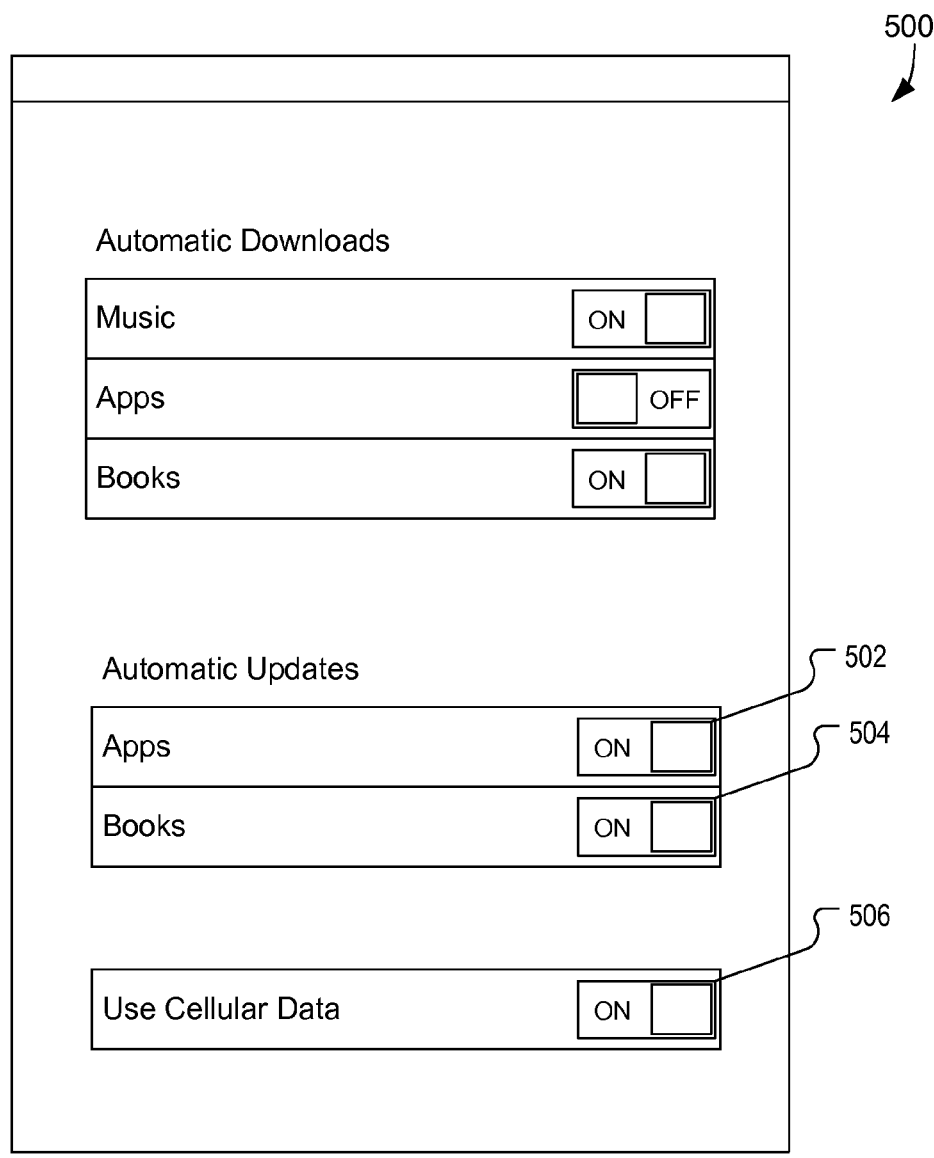
FIG. 5 is an example graphical user interface for configuring automatic updating of applications on a mobile device.

FIG. 5 is an example graphical user interface 500 for configuring automatic updating of applications on a mobile device. For example, GUI 500 can be a system configuration interface of the mobile device. A user can interact with elements of GUI 500 to enable or disable automatic updates for applications, electronic books or other media for which updates may be available, for example. GUI 500 can include graphical element 502 for enabling or disabling automatic updates for applications installed on the mobile device. For example, the user can select graphical element 502 to turn on or off automatic updating of applications installed on the mobile device. GUI 500 can include graphical element 504 for enabling or disabling automatic updates for electronic books stored on the mobile device. GUI 500 can include graphical element 506 for enabling or disabling the use of cellular data for downloading application updates. These selections can be used when determining how and/or when to download application updates, as described above with reference to FIG. 2 and FIG. 3.

Figure 6:
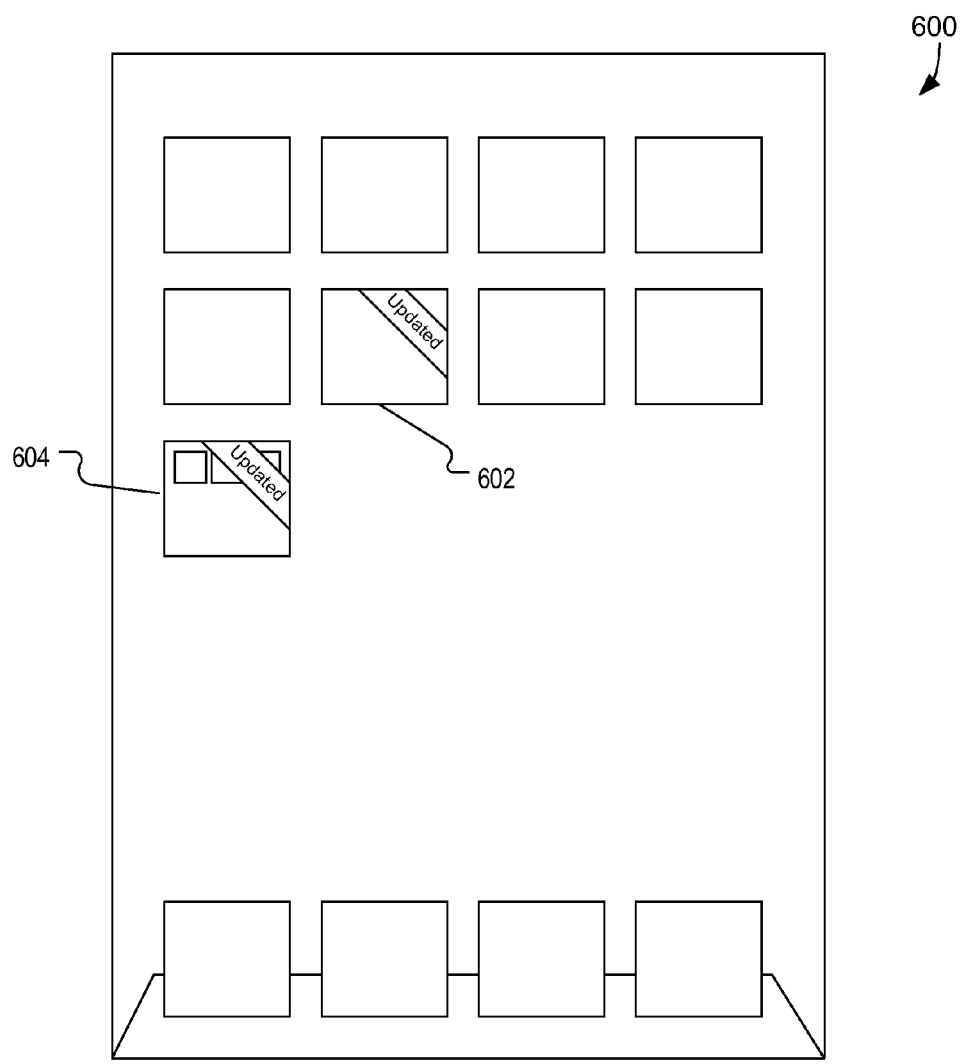
FIG. 6 is an example graphical user interface presenting indicia indicating which applications were updated on a mobile device.

FIG. 6 is an example graphical user interface 600 presenting indicia indicating which applications were updated on a mobile device. For example, GUI 600 can present graphical objects 602 and/or 604 corresponding to applications and application folders installed on the mobile device. For example, graphical object 602 can be an icon or image that represents an application installed on the mobile device. Graphical object 604 can be an icon or image that represents a grouping or folder of application installed on the mobile device. In some implementations, when an application has been updated on the mobile device, the appearance of application graphical object 602 can be modified to indicate that the corresponding application has been updated. For example, the application icon or image 602 can be modified to include indicia (e.g., a sash and the word "updated") that indicates that the application has been updated. Similarly, if an application within an application folder or grouping has been updated, then the icon or image 604 corresponding to the folder or grouping can be modified to include indicia (e.g., a sash and the word "updated") that indicates that the application has been updated. In some implementations, after a user has interacted with (e.g., selected, moved, etc.) graphical object 602 or 604, the updated application indicia can be removed from the graphical object.

Figure 7:
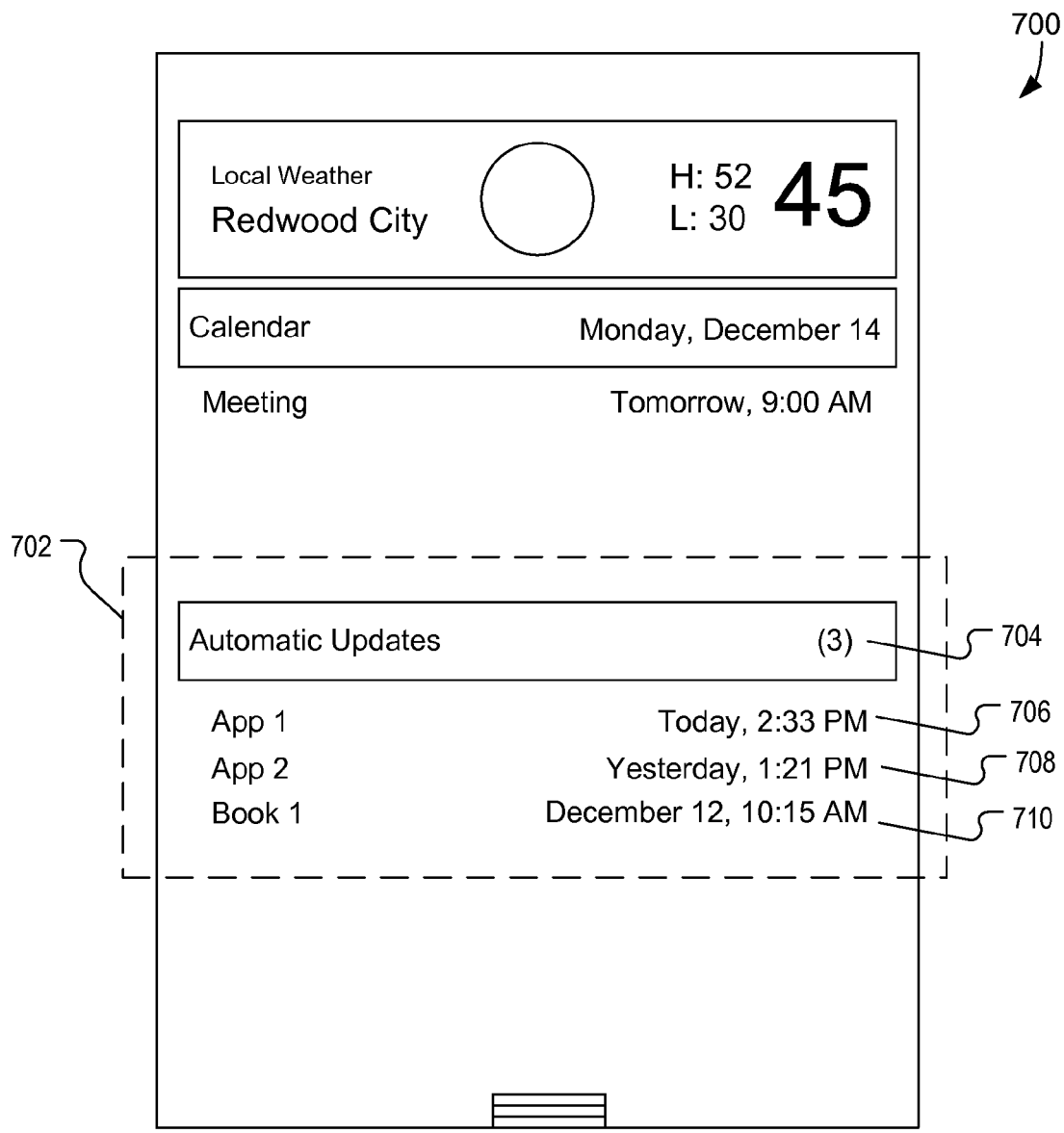
FIG. 7 is an example graphical user interface presenting notifications indicating which applications were updated on a mobile device.

FIG. 7 is an example graphical user interface 700 presenting notifications indicating which applications were updated on a mobile device. For example, the user can provide input to display notifications interface 700 on the mobile device. In some implementations, GUI 700 can include area 702 for presenting information about recently updated applications and/or other media (e.g., electronic books). In some implementations, area 702 can indicate the number 704 of recent automatic updates performed. In some implementations, area 702 can present information about individual applications 706, 708 and/or media items 710 that have been recently updated. For example, area 702 can present the names of recently updated applications and/or media items, and/or the date and time when the updates occurred. Updated items can be removed from area 702 after a period of time (e.g., three days) or after the user interacts with one of the items identified in area 702. In some implementations, a user can select one of the application update notifications displayed in area 702 to view additional information related to the corresponding application, as described further with respect to FIG. 8 below.

Figure 8:
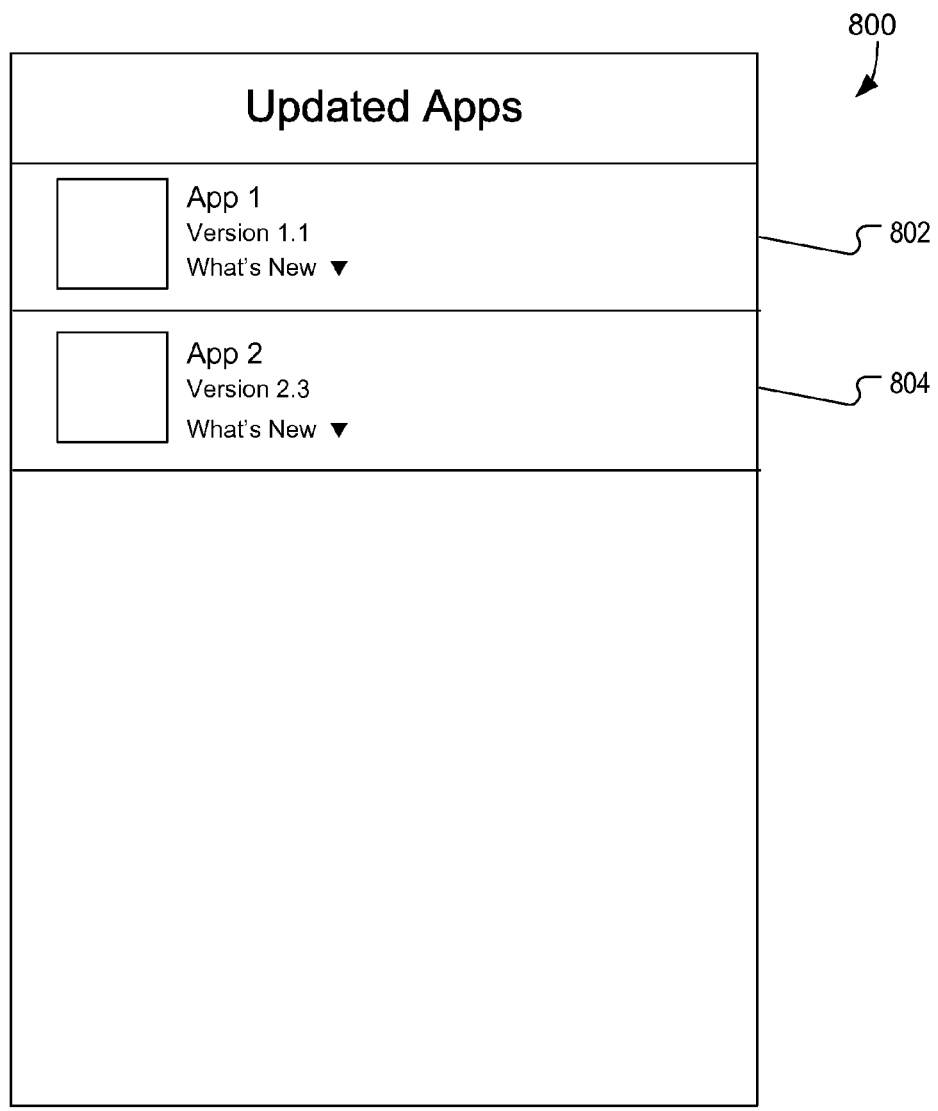
FIG. 8 is an example graphical user interface presenting information about applications that were updated on a mobile device.

FIG. 8 is an example graphical user interface 800 presenting information about applications that were updated on a mobile device. For example, GUI 800 can be invoked from an application service client interface on the mobile device. In some implementations, GUI 800 can present a list of applications that have been recently updated on the mobile device. For example, graphical elements 802 and 804 can present information about applications (e.g., "App 1" and "App2") that have been recently updated on the mobile device. In some implementations, a user can select graphical element 802 to view additional information about the corresponding application. For example, a user can select element 802 to view release notes about the updated version of App 1.

Example System Architecture

Figure 9:
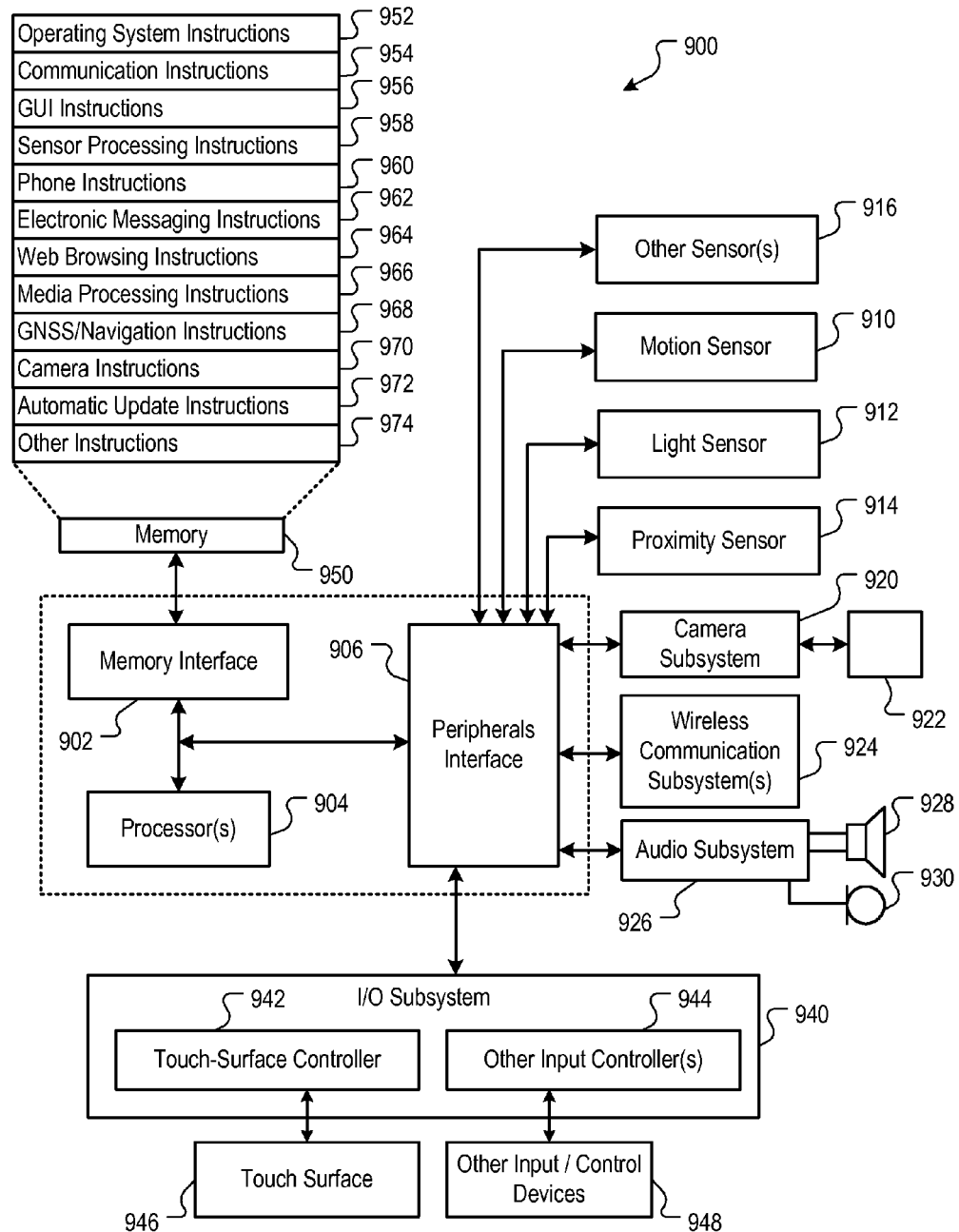
FIG. 9 is a block diagram of an example computing device that can implement the features and processes of FIGS. 1-8.

FIG. 9 is a block diagram of an example computing device 900 that can implement the features and processes of FIGS. 1-8. The computing device 900 can include a memory interface 902, one or more data processors, image processors and/or central processing units 904, and a peripherals interface 906. The memory interface 902, the one or more processors 904 and/or the peripherals interface 906 can be separate components or can be integrated in one or more integrated circuits. The various components in the computing device 900 can be coupled by one or more communication buses or signal lines.

Sensors, devices, and subsystems can be coupled to the peripherals interface 906 to facilitate multiple functionalities. For example, a motion sensor 910, a light sensor 912, and a proximity sensor 914 can be coupled to the peripherals interface 906 to facilitate orientation, lighting, and proximity functions. Other sensors 916 can also be connected to the peripherals interface 906, such as a global navigation satellite system (GNSS) (e.g., GPS receiver), a temperature sensor, a biometric sensor, magnetometer or other sensing device, to facilitate related functionalities.

A camera subsystem 920 and an optical sensor 922, e.g., a charged coupled device (CCD) or a complementary metal-oxide semiconductor (CMOS) optical sensor, can be utilized to facilitate camera functions, such as recording photographs and video clips. The camera subsystem 920 and the optical sensor 922 can be used to collect images of a user to be used during authentication of a user, e.g., by performing facial recognition analysis.

Communication functions can be facilitated through one or more wireless communication subsystems 924, which can include radio frequency receivers and transmitters and/or optical (e.g., infrared) receivers and transmitters. The specific design and implementation of the communication subsystem 924 can depend on the communication network(s) over which the computing device 900 is intended to operate. For example, the computing device 900 can include communication subsystems 924 designed to operate over a GSM network, a GPRS network, an EDGE network, a Wi-Fi or WiMax network, and a Bluetooth™ network. In particular, the wireless communication subsystems 924 can include hosting protocols such that the device 100 can be configured as a base station for other wireless devices.

An audio subsystem 926 can be coupled to a speaker 928 and a microphone 930 to facilitate voice-enabled functions, such as speaker recognition, voice replication, digital recording, and telephony functions. The audio subsystem 926 can be configured to facilitate processing voice commands, voiceprinting and voice authentication, for example.

The I/O subsystem 940 can include a touch-surface controller 942 and/or other input controller(s) 944. The touch-surface controller 942 can be coupled to a touch surface 946. The touch surface 946 and touch-surface controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 946.

The other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of the speaker 928 and/or the microphone 930.

In one implementation, a pressing of the button for a first duration can disengage a lock of the touch surface 946; and a pressing of the button for a second duration that is longer than the first duration can turn power to the computing device 900 on or off. Pressing the button for a third duration can activate a voice control, or voice command, module that enables the user to speak commands into the microphone 930 to cause the device to execute the spoken command. The user can customize a functionality of one or more of the buttons. The touch surface 946 can, for example, also be used to implement virtual or soft buttons and/or a keyboard.

In some implementations, the computing device 900 can present recorded audio and/or video files, such as MP3, AAC, and MPEG files. In some implementations, the computing device 900 can include the functionality of an MP3 player, such as an iPod™. The computing device 900 can, therefore, include a 36-pin connector that is compatible with the iPod. Other input/output and control devices can also be used.

The memory interface 902 can be coupled to memory 950. The memory 950 can include high-speed random access memory and/or non-volatile memory, such as one or more magnetic disk storage devices, one or more optical storage devices, and/or flash memory (e.g., NAND, NOR). The memory 950 can store an operating system 952, such as Darwin, RTXC, LINUX, UNIX, OS X, WINDOWS, or an embedded operating system such as VxWorks.

The operating system 952 can include instructions for handling basic system services and for performing hardware dependent tasks. In some implementations, the operating system 952 can be a kernel (e.g., UNIX kernel). In some implementations, the operating system 952 can include instructions for performing automatic updating of applications. For example, operating system 952 can implement the automatic application updating features as described with reference to FIGS. 1-8.

The memory 950 can also store communication instructions 954 to facilitate communicating with one or more additional devices, one or more computers and/or one or more servers. The memory 950 can include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GNSS/Navigation instructions 968 to facilitate GNSS and navigation-related processes and instructions; and/or camera instructions 970 to facilitate camera-related processes and functions.

The memory 950 can store other software instructions 972 to facilitate other processes and functions, such as the automatic application updating processes and functions as described with reference to FIGS. 1-8.

The memory 950 can also store other software instructions 974, such as web video instructions to facilitate web video-related processes and functions; and/or web shopping instructions to facilitate web shopping-related processes and functions. In some implementations, the media processing instructions 966 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 950 can include additional instructions or fewer instructions. Furthermore, various functions of the computing device 900 can be implemented in hardware and/or in software, including in one or more signal processing and/or application specific integrated circuits.

What is claimed is:

1. A method comprising:
    installing applications on a mobile device;
    periodically sending from the mobile device a request to an application service for application update information corresponding to the one or more installed applications;

receiving application update information from the application service identifying application updates available for downloading from the application service for one or more of the installed applications;

waiting a first specified period of time for the mobile device to connect to a wireless access point;

automatically downloading the application updates when the mobile device connects to the wireless access point within the first specified period of time, wherein automatically downloading the application updates comprises:

determining that a user has enabled a first option on the mobile device for automatic updating of installed applications of a first type and disabled a second option on the mobile device for automatic updating of installed applications of a second type; and in response to determining that the user has enabled the first option and disabled the second option, automatically downloading application updates for installed applications of the first type without downloading application updates for installed applications of the second type.

2. The method of claim 1, further comprising:

determining that the mobile device has not connected to the wireless access point within the first specified period of time;

determining whether downloading application updates over cellular data is enabled; and automatically downloading the application updates over a cellular data connection when the mobile device has not connected to the wireless access point within the first period of time and when cellular data downloads are enabled.

3. The method of claim 1, further comprising:

determining that a user has initiated a download to the mobile device; and pausing the automatic download of application updates until the user initiated download is complete.

4. The method of claim 2, further comprising:

in response to determining that downloading application updates over cellular data is not enabled, extending the first specified period of time by an additional known time period; and waiting for the extended first specified period of time for the mobile device to connect to a wireless access point.

5. The method of claim 2, further comprising:

in response to determining that downloading application updates over cellular data is not enabled, notifying a user of the mobile device about the availability of the application updates that have not been downloaded.

6. The method of claim 1, further comprising:

determining a parental control rating limit configured for the mobile device that restricts applications installed on the mobile device within a specified parental control rating;

determining that at least one of the application updates exceeds the parental control rating limit; and preventing the automatic downloading of the at least one application update while allowing other application updates that are within the parental control rating limit.

7. The method of claim 1, further comprising:

determining that an application installed on the mobile device and for which a corresponding application update has been downloaded in the mobile device is in use by a user of the mobile device;

waiting to install the application update for the installed application until the user stops using the installed application; and installing the application update for the installed application when the installed application is no longer being used by the user.

8. The method of claim 1, wherein waiting the first specified period of time for the mobile device to connect to the wireless access point comprises:

determining that a user has enabled an option on the mobile device for automatic updating of the installed applications; and in response to determining that the user has enabled the option, waiting the first specified period of time for the mobile device to connect to the wireless access point.

9. The method of claim 1, wherein automatically downloading the application updates when the mobile device connects to the wireless access point comprises:

identifying, based on caching server information stored by the mobile device, a caching server from which the mobile device has previously downloaded one or more of the installed applications or the application updates;

upon connecting to the wireless access point within the first specified period of time, waiting a second specified period of time for the mobile device to connect to the caching server; and automatically downloading the application updates from the caching server when the mobile device connects to the caching server through the wireless access point.

10. The method of claim 9, wherein waiting the second specified period of time for the mobile device to connect to the caching server further comprises:

determining, based on the stored caching server information, that the caching server has been previously accessed through the wireless access point to which the mobile device is connected; and waiting the second specified period of time for the mobile device to connect to the caching server based on determining that the caching server has been previously accessed through the wireless access point.

11. The method of claim 9, wherein determining the caching server from which the mobile device has previously downloaded one or more of the installed applications or the application updates comprises:

identifying a type of a first installed application for which an application update is available;

determining, based on the stored caching server information, that the mobile device has previously downloaded one or more applications corresponding to the identified type from the caching server; and in response to determining that the mobile device has previously downloaded applications corresponding to the identified type from the caching server, selecting the caching server for downloading the available application update for the first application.

12. The method of claim 9, further comprising:

determining that the mobile device has not connected to the caching server within the second specified period of time; and downloading the application updates from the application service when the mobile device has not connected to the caching server within the second specified period of time.

13. A non-transitory computer-readable medium including one or more sequences of instructions which, when executed by one or more processors, cause the one or more processors to perform operations comprising:

installing applications on a mobile device;
periodically sending from the mobile device a request to an application service for application update information corresponding to the one or more installed applications;
receiving application update information from the application service identifying application updates available for downloading from the application service for one or more of the installed applications;
waiting a first specified period of time for the mobile device to connect to a wireless access point;
automatically downloading the application updates when the mobile device connects to the wireless access point within the first specified period of time, wherein automatically downloading the application updates comprises:
  determining that a user has enabled a first option on the mobile device for automatic updating of installed applications of a first type and disabled a second option on the mobile device for automatic updating of installed applications of a second type; and
  in response to determining that the user has enabled the first option and disabled the second option, automatically downloading application updates for installed applications of the first type without downloading application updates for installed applications of the second type.

14. The non-transitory computer-readable medium of claim 13, wherein the instructions cause the one or more processors to perform operations further comprising:
  determining that the mobile device has not connected to the wireless access point within the first specified period of time;
  determining whether downloading application updates over cellular data is enabled; and
  automatically downloading the application updates over a cellular data connection when the mobile device has not connected to the wireless access point within the first period of time and when cellular data downloads are enabled.

15. The non-transitory computer-readable medium of claim 13, wherein the instructions cause the one or more processors to perform operations further comprising:
  determining that a user has initiated a download to the mobile device; and
  pausing the automatic download of application updates until the user initiated download is complete.

16. The non-transitory computer-readable medium of claim 13, wherein the instructions cause the one or more processors to perform operations further comprising:
  determining a parental control rating limit configured for the mobile device that restricts applications installed on the mobile device within a specified parental control rating;
  determining that at least one of the application updates exceeds the parental control rating limit; and
  preventing the automatic downloading of the at least one application update while allowing other application updates that are within the parental control rating limit.

17. The non-transitory computer-readable medium of claim 13, wherein the instructions cause the one or more processors to perform operations further comprising:
  determining that an application installed on the mobile device for which a corresponding application update has been downloaded in the mobile device is in use by a user of the mobile device;
  waiting to install the application update for the installed application until the user stops using the installed application; and
  installing the application update for the installed application when the installed application is no longer being used by the user.

18. A system comprising:
one or more processors; and
a computer-readable medium including one or more sequences of instructions which, when executed by the one or more processors, cause the one or more processors to perform operations comprising:
  installing applications on a mobile device;
  periodically sending from the mobile device a request to an application service for application update information corresponding to the one or more installed applications;
  receiving application update information from the application service identifying application updates available for downloading from the application service for one or more of the installed applications;
  waiting a first specified period of time for the mobile device to connect to a wireless access point;
  automatically downloading the application updates when the mobile device connects to the wireless access point within the first specified period of time, wherein automatically downloading the application updates comprises:
    determining that a user has enabled a first option on the mobile device for automatic updating of installed applications of a first type and disabled a second option on the mobile device for automatic updating of installed applications of a second type; and
    in response to determining that the user has enabled the first option and disabled the second option, automatically downloading application updates for installed applications of the first type without downloading application updates for installed applications of the second type.

19. The non-transitory computer-readable medium of claim 13, wherein automatically downloading the application updates when the mobile device connects to the wireless access point comprises:
  identifying, based on caching server information stored by the mobile device, a caching server from which the mobile device has previously downloaded one or more of the installed applications or the application updates;
  upon connecting to the wireless access point within the first specified period of time, waiting a second specified period of time for the mobile device to connect to the caching server; and
  automatically downloading the application updates from the caching server when the mobile device connects to the caching server through the wireless access point.

20. The system of claim 18, wherein the instructions cause the one or more processors to perform operations further comprising:
  determining that the mobile device has not connected to the wireless access point within the first specified period of time;
  determining whether downloading application updates over cellular data is enabled; and
  automatically downloading the application updates over a cellular data connection when the mobile device has not connected to the wireless access point within the first period of time and when cellular data downloads are enabled.

21. The system of claim 18, wherein the instructions cause the one or more processors to perform operations further comprising:
  determining that a user has initiated a download to the mobile device; and
  pausing the automatic download of application updates until the user initiated download is complete.

22. The system of claim 18, wherein the instructions cause the one or more processors to perform operations further comprising:
  determining a parental control rating limit configured for the mobile device that restricts applications installed on the mobile device within a specified parental control rating;
  determining that at least one of the application updates exceeds the parental control rating limit; and
  preventing the automatic downloading of the at least one application update while allowing other application updates that are within the parental control rating limit.

23. The system of claim 18, wherein the instructions cause the one or more processors to perform operations further comprising:
  determining that an application installed on the mobile device and for which a corresponding application update has been downloaded in the mobile device is in use by a user of the mobile device;
  waiting to install the application update for the installed application until the user stops using the installed application; and
  installing the application update for the installed application when the installed application is no longer being used by the user.

24. The system of claim 18, wherein automatically downloading the application updates when the mobile device connects to the wireless access point comprises:
  identifying, based on caching server information stored by the mobile device, a caching server from which the mobile device has previously downloaded one or more of the installed applications or the application updates;
  upon connecting to the wireless access point within the first specified period of time, waiting a second specified period of time for the mobile device to connect to the caching server; and
  automatically downloading the application updates from the caching server when the mobile device connects to the caching server through the wireless access point.

25. A method comprising:
  installing applications on a mobile device;
  periodically sending from the mobile device a request to an application service for application update information corresponding to the one or more installed applications;
  receiving application update information from the application service identifying application updates available for downloading from the application service for one or more of the installed applications;
  waiting a first specified period of time for the mobile device to connect to a wireless access point;
  conditioned on the mobile device not connecting to the wireless access point within the first specified period of time, determining whether downloading application updates over cellular data is enabled;
  conditioned on determining that downloading application updates over cellular data is not enabled, extending the first specified period of time by an additional known time period; and
  waiting for the additional known time period for the mobile device to connect to a wireless access point.

26. The method of claim 25, further comprising:
  automatically downloading the application updates upon connecting to the wireless access point within at least one of the first specified period of time or the additional known time period.

27. The method of claim 26, wherein automatically downloading the application updates when the mobile device connects to the wireless access point comprises:
  identifying, based on caching server information stored by the mobile device, a caching server from which the mobile device has previously downloaded one or more of the installed applications or the application updates;
  upon connecting to the wireless access point, waiting a second specified period of time for the mobile device to connect to the caching server; and
  automatically downloading the application updates from the caching server when the mobile device connects to the caching server through the wireless access point.

28. The method of claim 26, further comprising:
  determining that a user has initiated a download to the mobile device; and
  pausing automatic download of application updates until the user initiated download is complete.

29. The method of claim 26, further comprising:
  determining that an application installed on the mobile device and for which a corresponding application update has been downloaded in the mobile device is in use by a user of the mobile device;
  waiting to install the application update for the installed application until the user stops using the installed application; and
  installing the application update for the installed application when the installed application is no longer being used by the user.

30. The method of claim 25, further comprising:
  conditioned on determining that downloading application updates over cellular data is enabled, automatically downloading the application updates over a cellular data connection when the mobile device has not connected to the wireless access point within the first period of time.

* * * * *